(12) United States Patent
Horio et al.

(10) Patent No.: US 9,243,103 B2
(45) Date of Patent: Jan. 26, 2016

(54) POLYURETHANE FOAM FOR FLAME-LAMINATING

(75) Inventors: Fuminori Horio, Anjo (JP); Yasushi Yamada, Anjo (JP)

(73) Assignee: INOAC CORPORATION, Aichi (JP)

( * ) Notice: Subject to any disclaimer, the term of this patent is extended or adjusted under 35 U.S.C. 154(b) by 460 days.

(21) Appl. No.: 12/997,878

(22) PCT Filed: Jun. 23, 2009

(86) PCT No.: PCT/JP2009/061421
§ 371 (c)(1),
(2), (4) Date: Dec. 14, 2010

(87) PCT Pub. No.: WO2009/157450
PCT Pub. Date: Dec. 30, 2009

(65) Prior Publication Data
US 2011/0091689 A1    Apr. 21, 2011

(30) Foreign Application Priority Data

Jun. 25, 2008  (JP) ................................. 2008-166533

(51) Int. Cl.
| | |
|---|---|
| C08G 18/48 | (2006.01) |
| C08G 18/18 | (2006.01) |
| C08G 18/16 | (2006.01) |
| C08G 18/20 | (2006.01) |
| C08G 18/24 | (2006.01) |
| C08G 18/40 | (2006.01) |
| C08G 18/42 | (2006.01) |
| C08G 18/63 | (2006.01) |
| C08G 101/00 | (2006.01) |

(52) U.S. Cl.
CPC .......... *C08G 18/4837* (2013.01); *C08G 18/165* (2013.01); *C08G 18/18* (2013.01); *C08G 18/2027* (2013.01); *C08G 18/246* (2013.01); *C08G 18/4018* (2013.01); *C08G 18/4072* (2013.01); *C08G 18/4261* (2013.01); *C08G 18/48* (2013.01); *C08G 18/632* (2013.01); *C08G 2101/00* (2013.01); *C08G 2101/0083* (2013.01); *Y10T 428/24512* (2015.01); *Y10T 428/249953* (2015.04)

(58) Field of Classification Search
CPC .. C08G 18/18; C08G 18/165; C08G 18/2027; C08G 18/48; C08G 18/632; C08G 18/4837; C08G 2101/00; C08G 2101/0083
USPC .................................. 521/128, 129, 134, 174
See application file for complete search history.

(56) References Cited

U.S. PATENT DOCUMENTS

| | | | | |
|---|---|---|---|---|
| 4,385,131 | A  * | 5/1983 | Fracalossi et al. .............. | 521/55 |
| 5,891,928 | A | 4/1999 | Chakrabarti et al. | |
| 5,900,087 | A | 5/1999 | Chakrabarti et al. | |
| 6,590,057 | B1 * | 7/2003 | Brecht et al. .................... | 528/52 |

FOREIGN PATENT DOCUMENTS

| | | |
|---|---|---|
| EP | 0 814 106 A2 | 12/1997 |
| EP | 1 834 974 A2 | 9/2007 |
| JP | 46-030309 B | 9/1971 |
| JP | 04-266919 | 9/1992 |
| JP | 09-151234 | 6/1997 |
| JP | 2003-252946 | 9/2003 |
| WO | WO 2004/094506 | * 11/2004 |

OTHER PUBLICATIONS

Extended European Search Report for corresponding European Application No. 097701601, dated Jul. 7, 2014, 5 pages.

* cited by examiner

*Primary Examiner* — John Cooney
(74) *Attorney, Agent, or Firm* — Ditthavong & Steiner, P.C.

(57) ABSTRACT

The object of the present invention is to provide a polyurethane foam for flame lamination which has an excellent balance between adhesiveness to a fabric comprising synthetic fibers or natural fibers, a leather or the like and residual compression strain and has an excellent wet-heat resistance, and a laminated body including a foamed material layer consisting of the polyurethane foam. The polyurethane foam for flame lamination is characterized by being produced using a foam raw material containing a polyol such as a polyether polyol, a polyisocyanate, a foaming agent, a foam control agent, an amine-based catalyst and a urea compound such as urea and azodicarbonamide.

11 Claims, No Drawings

POLYURETHANE FOAM FOR FLAME-LAMINATING

TECHNICAL FIELD

The present invention relates to a polyurethane foam for flame lamination which is excellent in a balance of adhesiveness with a fabric made of synthetic fibers or natural fibers, a leather and the like and compression residual strain and also excellent in wet-heat resistance.

BACKGROUND ART

A laminated body provided with a foamed material layer consisting of a polyurethane or the like and a skin material layer arranged at least on its one face side is widely used for an interior material for vehicle; furniture; living goods such as cloth and general merchandise; sanitary products; medical products; nursing products and the like. In the production of such a laminated body, a flame lamination method, which is considered to be advantageous in view of economy and simplicity in operation, that is, a method in which a surface of a foamed material is partially molten by heat and, a sheet or a film made of synthetic fibers, natural fibers or the like is pressed and bonded to this portion is applied more widely than a method using an adhesive.

A polyurethane foam used in the flame lamination method is described in Patent Documents 1 to 4.

In Patent Document 1, a polyurethane foam is disclosed which is obtained by foaming and curing a foam raw material containing a polyetherester polyol and an organic phosphorus compound having an active hydrogen atom.

In Patent Document 2, a polyurethane foam is disclosed which is obtained by foaming and curing a foam raw material containing a polyetherester polyol, a polyol having a hydroxyl value of 200 to 300 mg KOH/g and a phosphorus containing compound, and has a low impact resilience.

In Patent Document 3, a polyurethane foam is disclosed which is obtained by foaming and curing a foam raw material containing a polyoxyalkylene ether polyol and tolylene diisocyanate with 2,4 isomeric ratio of 84% or more.

Additionally, in Patent Document 4, a polyurethane foam for flame lamination is disclosed which is obtained by foaming a foam raw material containing a polyoxyalkylene ether polyol, a polyisocyanate and a crosslinking agent consisting of a polyol that has a hydroxyl value of 300 to 700 mg KOH/g and 2 to 6 functional groups and is a polyol excluding the above polyoxyalkylene ether polyol.
[Patent Document 1] JP-B S46-30309
[Patent Document 2] JP-A H09-151234
[Patent Document 3] JP-A 2003-252946
[Patent Document 4] JP-A H04-266919

DISCLOSURE OF THE INVENTION

Problems that the Invention is to Solve

According to the polyurethane foams described in Patent Documents 1 and 2, since the foam raw materials contain an organic phosphorus compound, the compound functions as a plasticizer, causes problem of deterioration of physical characteristics such as compression residual strain and hardness, and leads to insufficient adhesiveness with a member for skin material layer.

Additionally, even if a content of a catalyst is increased in the foam raw material disclosed in Patent Document 3 for the purpose of improving the physical characteristics of the polyurethane foam, adhesiveness with the member for skin material layer and the like, a volatile organic compound (hereinafter referred to as "VOC") causing a bad odor or the like volatilizes. In the case where the polyurethane foam is used in a part of an interior material for vehicle, furniture, living goods and the like, there is a problem in which the VOC attaches to a glass surface of an automobile or housing and a worry about an influence on a human body like formaldehyde causing a sick house syndrome.

Moreover, the polyurethane foam disclosed in Patent Document 4 has a certain performance in adhesiveness (peel strength) with a member for skin material layer, however, further improvement has been in demand.

The object of the present invention is to provide a polyurethane foam for flame lamination which has an excellent balance between adhesiveness to a fabric made of synthetic fibers or natural fibers, a leather or the like and residual compression strain and has an excellent wet-heat resistance. In addition, another object of the present invention is to provide a polyurethane foam for flame lamination which has an excellent balance between adhesiveness to a fabric made of synthetic fibers or natural fibers, a leather or the like and residual compression strain, has an excellent wet-heat resistance, and has a reduced VOC total value.

Means for Solving the Problems

The inventors made a keen examination on a polyurethane foam for flame lamination, which is excellent in the above performances. A polyurethane foam obtained using a foam raw material consisting of, for example, a polyether polyol, a polyisocyanate, a foaming agent, a foam control agent (foam stabilizer, surfactant) and an amine-based catalyst is insufficient in adhesiveness with a fabric made of a synthetic fibers or natural fibers, a leather and the like. When a phosphate compound (or a phosphate compound) was formulated in this foam raw material, slight improvement was found, but compression residual strain was lowered. In addition, when a polyether polyol and polyester polyol were used at the same time, sufficient adhesiveness and wet-heat resistance were not obtained.

The present invention was made in view of the above circumstances. The present invention is as follows.
1. A polyurethane foam for flame lamination characterized in that the polyurethane foam is produced using a foam raw material comprising a polyol, a polyisocyanate, a foaming agent, a foam control agent, an amine-based catalyst and a urea compound.
2. The polyurethane foam for flame lamination according to 1 above,
   wherein the polyol is consisting of a polyether polyol.
3. The polyurethane foam for flame lamination according to 1 above,
   wherein the polyol is consisting of a polyether polyol and a polymer polyol.
4. The polyurethane foam for flame lamination according to any one of 1 to 3 above,
   wherein the content of the amine-based catalyst is in the range from 0.03 to 0.20 part by weight based on 100 parts by weight of the polyol.
5. The polyurethane foam for flame lamination according to any one of 1 to 4 above,
   wherein the urea compound is at least one compound selected from the group consisting of urea, methylurea, ethylurea, phenylurea, benzylic urea, tolyl urea, biuret, triuret, biurea, thiourea, azodicarbonamide, hydrazodicarbonamide, 4,4'-oxybisbenzenesulfonylhydrazide, 2-dimethylaminoethylurea, N,N-bis(2-dimethylaminoethyl)urea, 3-dimethylaminopropylurea and N,N-bis(3-dimethylaminopropyl)urea.

6. The polyurethane foam for flame lamination according to 5 above,
   wherein the urea compound is a urea, and
   wherein the content of the urea is in the range from 0.05 to 5.5 parts by weight based on 100 parts by weight of the polyol.

7. The polyurethane foam for flame lamination according to 6 above,
   wherein the urea compound is a urea,
   wherein the content of the urea is in the range from 0.8 to 3.5 parts by weight based on 100 parts by weight of the polyol, and
   wherein the content of the amine-based catalyst is in the range from 0.05 to 0.16 part by weight based on 100 parts by weight of the polyol.

8. The polyurethane foam for flame lamination according to 5 above,
   wherein the urea compound is azodicarbonamide, and
   wherein the content of the azodicarbonamide is in the range from 0.05 to 7.0 parts by weight based on 100 parts by weight of the polyol.

9. The polyurethane foam for flame lamination according to any one of 1 to 8 above, which is used for an interior material for vehicle.

10. A laminated body characterized by comprising a foamed material layer consisting of the polyurethane foam for flame lamination according to any one of 1 to 8 above and a skin material layer at least partially bonded to a surface of the foamed material layer.

11. An interior material for vehicle characterized by comprising the laminated body according to 10 above.

Effect of the Invention

According to the polyurethane foam for flame lamination of the present invention, a balance between adhesiveness to a fabric made of synthetic fibers or natural fibers, a leather or the like and residual compression strain is excellent, and a wet-heat resistance is excellent.

In the case where the polyol is consisting of a polyether polyol, hydrolysis of the polyurethane foam can be suppressed, and excellent shape retention can be obtained. Therefore, when this polyurethane foam is used to form a composite product such as a laminated body produced by the flame lamination method, the product is excellent in wet-heat resistance and durability.

In the case where the polyol is consisting of a polyether polyol and a polymer polyol, hardness can be improved, VOC total value can be reduced, and durability is excellent without deteriorating a balance between adhesiveness and compression residual strain in the polyurethane foam.

Additionally, in the case where the content of the amine-based catalyst is in the range from 0.03 to 0.20 part by weight based on 100 parts by weight of the polyol, a balance between adhesiveness and compression residual strain is excellent.

In the case where the urea compound is at least one compound selected from the group consisting of urea, methylurea, ethylurea, phenylurea, benzylic urea, tolyl urea, biuret, triuret, biurea, thiourea, azodicarbonamide, hydrazodicarbonamide, 4,4'-oxybisbenzenesulfonylhydrazide, 2-dimethylaminoethylurea, N,N-bis(2-dimethylaminoethyl)urea, 3-dimethylaminopropylurea and N,N-bis(3-dimethylaminopropyl)urea, a balance between adhesiveness and compression residual strain is excellent, and wet-heat resistance is also excellent.

In the case where the urea compound is a urea, and the content of the urea is in the range from 0.05 to 5.5 parts by weight based on 100 parts by weight of the polyol, a balance between adhesiveness and compression residual strain is excellent, and wet-heat resistance is also excellent.

In the case where the urea compound is a urea, the content of the urea is in the range from 0.8 to 3.5 parts by weight based on 100 parts by weight of the polyol, and the content of the amine-based catalyst is in the range from 0.05 to 0.16 part by weight based on 100 parts by weight of the polyol, a balance between adhesiveness and compression residual strain is remarkably excellent, VOC total value can be reduced, and durability is excellent.

In the case where the urea compound is azodicarbonamide, and the content of the azodicarbonamide is in the range from 0.05 to 7.0 parts by weight based on 100 parts by weight of the polyol, a balance between adhesiveness and compression residual strain is remarkably excellent, and wet-heat resistance is also excellent.

Since the laminated body of the present invention is excellent in strength and stability as a laminated article, the laminated body is suitable for a interior material for vehicle which is arranged in an automobile, a motorcycle and the like and in which durability is required against a load, such as component members including a seat portion, a seat back portion and the like.

Since the interior material for vehicle of the present has the above laminated body, the interior material for vehicle is suitable for component members including a seat portion, a seat back portion and the like that are arranged in an automobile, a motorcycle and the like.

BEST MODE FOR CARRYING OUT THE INVENTION

Hereinafter, the present invention is described in detail. In the specification, "(meth)acryl" means acryl and methacryl, and "(meth)acrylate" means acrylate and methacrylate.

In addition, the "VOC total value" is a value based on the VOC measurement method regulated by VDA 278 (Verband der Automobilindustrie).

The polyurethane foam for flame lamination of the present invention is characterized by being produced using a foam raw material comprising a polyol, a polyisocyanate, a foaming agent, a foam control agent (foam stabilizer, surfactant), an amine-based catalyst and a urea compound. In the present invention, the polyurethane foam for flame lamination of the present invention is used for a laminated body by forming a skin material layer made of a fabric or the like at least on its one face side, and this laminated body is suitable for an interior material for vehicle; furniture; living goods such as cloth and general merchandise; sanitary products; medical products; nursing products and the like. The polyurethane foam for flame lamination of the present invention is particularly suitable as component members including a seat portion and a seat back portion in a seat of a vehicle (seat), a child seat and the like; a cushion material for a bed, a mattress and the like for furniture and a seat portion and a seat back portion in a seat of a chair, sofa and the like, a pad and the like.

The polyol contained in the foam raw material is not particularly limited so long as it is a compound having two or more hydroxyl groups. The widely known compounds for the formation of the general polyurethane foam can be used as the polyol.

Examples of the polyol include (1) a polyalcohol, (2) a polyphenol, (3) an alkanolamine having two or more hydroxyl groups, (4) a natural fat polyol such as castor oil, (5) a polyether polyol, (6) a polyether ester polyol, (7) a polyester polyol, (8) a polydiene polyol, (9) an acryl polyol, (10) a silicone polyol, (11) a polymer polyol obtained by polymerizing a vinyl-based monomer in the presence of at least one compound (raw material polyol) selected from the above (1) to (10), and the like.

Examples of the polyalcohol include a divalent alcohol having carbon atoms of 2 to 20 containing an aliphatic diol including an alkylene glycol such as ethylene glycol, propylene glycol, 1,3-butanediol, 1,4-butanediol, 1,6-hexanediol and neopentyl glycol and an alicyclic diol including a cycloalkylene glycol such as cyclohexane diol and cyclohexane dimethanol; a trivalent alcohol having carbon atoms of 3 to 20 containing an aliphatic triol including an alkane triol such as glycerin, trimethylol propane and hexane triol; an alcohol of tetravalent, pentavalent, hexavalent, heptavalent or octavalent having carbon atoms of 5 to 20 containing an aliphatic polyol including an alkane polyol such as pentaerythritol, sorbitol, mannitol, sorbitan, diglycerin and dipentaerythritol, a more valued polyalcohol; and the like.

Examples of the polyphenol include a monocyclic polyphenol such as pyrogallol and hydroquinone; a bisphenol such as bisphenol A, bisphenol F and bisphenol sulfone; a condensate of phenol and formaldehyde (novolac), and the like.

Examples of the alkanolamine having two or more hydroxyl groups include diethanolamine, ethanol isopropanolamine, diisopropanolamine, ethanol-2-hydroxybutylamine, isopropanol-2-hydroxybutylamine, triethanolamine and the like.

Examples of the polyether polyol include a compound obtained by addition (block and/or random addition) of an alkylene oxide such as ethylene oxide, propylene oxide, 1,2-butylene oxide, 2,3-butylene oxide and 1,4-butylene oxide to at least one compound selected from the group consisting of the polyalcohol, the polyphenol and an amine compound including the alkanolamine, and the like.

The amine compound may contain an amine compound other than the alkanolamine and example thereof includes an aliphatic amine compound containing a mono alkanolamine having carbon atoms of 2 to 20, such as mono ethanolamine, isopropanolamine and aminoethylethanolamine, a mono amine compound having carbon atoms of 1 to 20, such as n-butylamine and octylamine, a diamine compound having carbon atoms of 2 to 6, such as ethylenediamine, propylenediamine and hexamethylenediamine, a polyalkylene polyamine having carbon atoms of 4 to 20, such as diethylenetriamine and triethylenetetramine, and the like; an aromatic amine compound having carbon atoms of 6 to 20, such as aniline, phenylenediamine, tolylene diamine, xylylene diamine, diethyltoluene diamine, methylenedianiline and diphenyletherdiamine; an alicyclic amine compound having carbon atoms of 4 to 20, such as isophorondiamine, cyclohexylene diamine and dicyclohexylmethane diamine; a heterocyclic amine compound having carbon atoms of 4 to 20, such as piperadine and aminoethylpiperadine; and the like.

The polyether polyol is preferably a compound obtained by addition of propylene oxide and/or ethylene oxide to a polyalcohol such as polypropylene glycol, polytetramethylene glycol, glycerin, dipropyleneglycol and trimethylolpropane.

Examples of the polyether ester polyol include a compound obtained by reaction of a polyalkylene polyol such as polyethylene glycol, polypropylene glycol and propyleneoxide-added glycerin, a polycarboxylic anhydride such as succinic anhydride, adipic anhydride and phthalic anhydride and a compound having a cyclic ether group such as ethyleneoxid and propyleneoxide; and the like.

Examples of the polyester polyol include a condensed polyester polyol obtained by reaction of a polycarboxylic acid such as adipic acid and phthalic acid and a polyol such as ethyleneglycol, diethyleneglycol, propyleneglycol and glycerin, such as polyethylene adipate diol, polybutylene adipate diol, polyhexamethylene adipate diol, polyneopentyl adipate diol, polyethylene-butylene adipate diol, polyneopentyl-hexamethylene adipate diol, poly 3-methylpentane adipate diol, polyethylene terephthalate diol, polybutylene terephthalate diol, polyhexamethylene terephthalate diol, polyneopentyl terephthalate diol, polyethylene-butylene terephthalate diol, polyneopentyl-hexamethylene terephthalate diol, poly 3-methylpentane terephthalate diol, polyethylene isophthalate diol, polybutylene isophthalate diol, polyhexamethylene isophthalate diol, polyneopentyl isophthalate diol, polyethylene-butylene isophthalate diol, polyneopentyl-hexamethylene isophthalate diol, and poly 3-methyl pentane isophthalate diol; a lactone-based polyester polyol; a polycarbonate-based polyester polyol; and the like.

The polymer polyol is a polyol which can give an improved hardness to the polyurethane foam obtained using a foam raw material containing the same.

The polymer polyol may be a compound (graft polymer) obtained by polymerizing a vinyl-based monomer using a polymerization initiator in the presence of a raw material polyol such as the polyether polyol and polyester polyol. In this reaction, a chain transfer agent can be also used.

Examples of the vinyl-based monomer include an aromatic vinyl compound, an unsaturated nitrile compound, a (meth) acrylic acid ester compound, and the like. The vinyl-based monomer may be used singly or in combination of two or more types thereof.

Examples of the aromatic vinyl compound include styrene, α-methyl styrene, vinyl toluene, vinyl naphthalene, hydroxystyrene and the like. Among these, styrene is preferred.

Examples of the unsaturated nitrile compound include acrylonitrile, methacrylonitrile and the like. Among these, acrylonitrile is preferred.

Examples of the (meth)acrylic acid ester compound include an alkyl ester of (meth)acrylic acid such as methyl (meth)acrylate, ethyl (meth)acrylate, propyl (meth)acrylate, butyl (meth)acrylate, amyl (meth)acrylate, hexyl (meth)acrylate, octyl (meth)acrylate, 2-ethylhexyl (meth)acrylate, lauryl (meth)acrylate and stearyl (meth)acrylate; a hydroxyalkyl (meth)acrylate such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; and the like.

Examples of the other vinyl-based compound include an unsaturated acid such as (meth)acrylic acid; an unsaturated amide compound such as (meth)acrylamide; an unsaturated compound having an amino group such as diaminoethyl methacrylate and morpholinoethy methacrylate; a vinyl compound containing a halogen atom such as vinylidene chloride, perfluoro-octylethyl methacrylate and perfluoro-octylethyl acrylate; a multifunctional vinyl compound such as divinylbenzene, ethylene di(meth)acrylate, polyalkyleneglycol di(meth)acrylate, pentaerythritol tri(meth)acrylate, dipentaerythritol penta(meth)acrylate, dipentaerythritol tetra (meth)acrylate, dipentaerythritol tri(meth)acrylate, dipentaerythritol di(meth)acrylate, trimethylolpropane di(meth) acrylate, and trimethylolpropane tri(meth)acrylate; and the like.

The vinyl-based monomer preferably contains an aromatic vinyl compound and an unsaturated nitrile compound. The vinyl-based monomer particularly is consisting of only an aromatic vinyl compound or is in combination of an aromatic vinyl compound and an unsaturated nitrile compound. The contents of the aromatic vinyl compound and the unsaturated nitrile compound contained in this preferable vinyl-based monomer are respectively, preferably 40% to 80% by weight and 20% to 60% by weight, and more preferably 45% to 75% by weight and 25% to 55% by weight, based on 100% by weight of the total of the both. With the above contents, hardness of the obtained polyurethane foam is improved, a balance between adhesiveness and compression residual strain is excellent, and the VOC total value is reduced.

Example of the polymerization initiator include an azo compound such as 2,2'-azobisisobutyronitrile, 2,2'-azobis(2,4-dimethylvaleronitrile), and 2,2'-azobis(2-methylbutyronitrile); an organic peroxide such as dibenzoyl peroxide, dicumyl peroxide, benzoyl peroxide, lauroyl peroxide, and persuccinic acid; an inorganic proxide such as persulfate and perborate; and the like.

Examples of the chain transfer agent include a mercaptan compound such as dodecane thiol, ethane thiol, octane thiol, and toluene thiol; a halogenated hydrocarbon such as carbon tetrachloride, carbon tetrabromide and chloroform; and the like.

The weight ratio of the raw material polyol and the vinyl-based monomer used for the production of the polymer polyol is as follows. That is, the amount of the vinyl-based monomer is preferably in the rage from 5 to 60 parts by weight, more preferably from 10 to 40 parts by weight, and further preferably from 20 to 30 parts by weight based on 100 parts by weight of the raw material polyol. With the above amount of the vinyl-based monomer to be used, hardness of the obtained polyurethane foam is improved, a balance between adhesiveness and compression residual strain is excellent, and the VOC total value is reduced.

The polyol contained in the foam raw material may be used singly or in combination of two or more types thereof. The preferable polyol in the present invention is a polyol containing a polyether polyol in an amount of 20% to 100% by weight. Specifically, (1) polyether polyol and (2) a combination of polyether polyol and other polyols are particularly preferred. In the case of above embodiment (1), an excellent balance between adhesiveness of a resulting polyurethane foam and a fabric made of synthetic fibers or natural fibers, a leather or the like and residual compression strain is obtained and an excellent wet-heat resistance is also obtained. In addition, a mixing design for the foam raw material is easy, and facilities can be arranged rapidly. In the case of the above embodiment (2), a polyol consisting of a polyether polyol and a polymer polyol is preferably used, and the contents of the both are respectively preferably 40% to 65% by weight and 35% to 60% by weight, and more preferably 45% to 60% by weight and 40% to 55% by weight, based on 100% by weight of the total of the both. With regard to the polyurethane foam for flame lamination obtained using the foam raw material containing a polyether polyol as a polyol, in the case where a polyether ester polyol or a polyester polyol is used, hydrolysis found when polyester polyol is used is particularly suppressed, compression residual strain is small, and shape retention is excellent.

Therefore, when a laminated body is formed by the flame lamination method using the polyurethane foam obtained using the foam raw material containing a polyol containing a polyether polyol in an amount of 20% to 100% by weight and a fabric or the like, a composite product provided with this laminated body is excellent in wet-heat resistance and durability. In the case of the above embodiment (2), the amount of an amine-based catalyst into the foam raw material can be reduced, by which VOC reduction effect can be improved.

The average hydroxyl value of the polyol is usually in the range from 30 to 80 mg KOH/g, and preferably from 40 to 70 mg KOH/g since favorable physical characteristics such as particularly compression residual strain and foaming stability can be maintained with that value. If the average hydroxyl value is too small, a soft elasticity unique to a soft foam may not be easily obtained and a polyurethane foam having small compression residual strain may not be obtained. On the other hand, if it is too large, reactivity is deteriorated to lead an unfavorable foam.

Additionally, the average number of functional group (average of the number of hydroxyl group) in the polyol is usually 2 to 6, and preferably 2 to 4 since favorable physical characteristics such as compression residual strain and foaming stability can be maintained with that value. If this average number of functional group is too small, a sufficient crosslinking structure may not be obtained and foaming stability may not be sufficient. On the other hand, if it is too large, a soft elasticity unique to a soft foam may not be easily obtained and a polyurethane foam having small compression residual strain may not be obtained.

Moreover, the weight-average molecular weight of the polyol is usually in the range from 1,500 to 5,000, and preferably from 2,000 to 4,000 since favorable physical characteristics such as compression residual strain and foaming stability can be maintained with that value. If the weight-average molecular weight is too small, a soft elasticity unique to a soft foam may not be easily obtained and a polyurethane foam having small compression residual strain may not be obtained. On the other hand, if it is too large, a sufficient crosslinking structure may not be obtained and foaming stability may not be sufficient. In the case where the polyol is a polymer polyol, the weight-average molecular weight thereof is usually in the range from 2,500 to 7,000 and preferably from 4,000 to 6,000.

The polyisocyanate contained in the foam raw material is not particularly limited so long as it is a compound having two or more isocyanate groups. The widely known compounds for the formation of the general polyurethane foam can be used as the polyisocyanate. The polyisocyanate may be used singly or in combination of two or more types thereof.

Examples of the polyisocyanate include various isocyanate compounds of aromatic-based, aliphatic-based, and alicyclic-based compound, and modified isocyanate compounds thereof.

Examples of the aromatic isocyanate include diphenylmethane diisocyanate (MDI), crude diphenylmethane diisocyanate, tolylene diisocyanate, naphthalene diisocyanate (NDI), p-phenylene diisocyanate (PPDI), xylene diisocyanate (XDI), tetramethylxylylene diisocyanate (TMXDI), tolidine diisocyanate (TODI), and the like.

Examples of the aliphatic isocyanate include hexamethylene diisocyanate (HDI), lysine diisocyanate (LDI), lysine tri-isocyanate (LTI), and the like.

Examples of the alicyclic isocyanate include isophorone diisocyanate (IPDI), cyclohexyl diisocyanate (CHDI), hydrogenated XDI ($H_6$XDI), hydrogenated MDI ($H_{12}$MDI), and the like.

Examples of the modified isocyanates include a urethane modified compound, a dimer, a trimer, a carbodiimide modified compound, an allophanate modified compound, a biuret modified compound, a urea modified compound, an isocyanurate modified compound, an oxazolidone modified compound, and a prepolymer having an isocyanate group at its terminal, of the above isocyanate compound and the like.

The preferable polyisocyanate in the present invention is tolylene diisocyanate.

The content of the polyisocyanate in the foam raw material is appropriately adjusted according to a predetermined isocyanate index. The isocyanate index in the foam raw material according to the present invention is preferably in the range from 70 to 130, more preferably from 100 to 125, and further preferably from 105 to 120. When the isocyanate index is within the above range, a polyurethane foam having excellent elasticity, air permeability (water permeability) and compression residual strain can be obtained.

The isocyanate index is an index indicating a weight ratio of a polyol (active hydrogen compound) and an isocyanate which is calculated so that the index in stoichiometric equivalent reaction of a polyisocyanate with a hydroxyl group becomes 100 and is expressed by the following equation.

Isocyanate index={(actual isocyanate amount)/(stoichiometrically calculated isocyanate amount)}×100

Examples of the foaming agent contained in the foam raw material include a water generating a carbon dioxide gas as a foaming agent by reacting with the polyisocyanate; a hydrocarbon functioning as a foaming agent by being evaporated by reaction heat in polyurethane formation, such as cyclopentane, isopentane and normal pentane; a halogen compound such as chloro methylene, trichlorofluoromethane, dichlorodifluoromethane, nonafluorobutylmethylether, nonafluorobutylethylether, pentafluoroethylmethylether, and heptafluoroisopropylmethylether; a liquefied carbon dioxide functioning as a foaming agent by mixing a liquefied carbon dioxide in the material under a high pressure and being evaporated in foaming; and the like. Among them, water is preferable, and ion exchanged water, tap water, distilled water and the like can be used. The foaming agent may be used singly or in combination of two or more types thereof. When a foaming agent consisting of two or more kinds of the above components is used, lighter polyurethane foam can be obtained. In this case, water is preferably contained, and a combination of water and a halogen compound is preferable.

In the case where the foaming agent is water, the content of the foaming agent in the foam raw material is preferably in the range from 0.5 to 7 parts by weight, and more preferably from 1 to 5 parts by weight based on 100 parts by weight of the polyol. When the content of the foaming agent is within the above range, a polyurethane foam having excellent elasticity, air permeability (water permeability) and compression residual strain can be obtained.

Additionally, in the case where the foaming agent is consisting of water and at least one of other foaming agent, the content of the foaming agent in the foam raw material is preferably in the range from 0.5 to 20 parts by weight, and more preferably from 1 to 15 parts by weight based on 100 parts by weight of the polyol. When the content of the foaming agent is within the above range, a polyurethane foam having excellent elasticity, air permeability (water permeability) and compression residual strain can be obtained.

Examples of the foam control agent (foam stabilizer, surfactant) contained in the foam raw material include a dimethylsiloxane-based compound, a polyether dimethylsiloxane-based compound, a phenylmethylsiloxane-based compound, and the like. The foam control agent may be used singly or in combination of two or more types thereof.

The content of the foam control agent in the foam raw material is preferably in the range from 0.1 to 5 parts by weight, and more preferably from 0.5 to 2 parts by weight based on 100 parts by weight of the polyol.

As the amine-based catalyst contained in the foam raw material, a monoamine compound, a diamine compound, a triamine compound, a polyamine compound, a cyclic amine compound, an alcohol amine compound, an etheramine compound, a hydroxylated or aminated reactive amine-based catalyst so that a part of the structure in these compounds reacts with a polyisocyanate, and the like can be used. Specific compounds include triethylamine, N,N-dimethylcyclohexylamine, triethylenediamine, N,N,N',N'-tetramethylethylenediamine, N,N,N',N'-tetramethylpropane-1,3-diamine, N,N,N',N'-tetramethylhexane-1,6-diamine, N,N,N',N'',N''-pentamethyldiethylenetriamine, N,N,N',N'',N''-pentamethyldipropylenetriamine, tetramethylguanidine, N,N-dipolyoxyethylenestearylamine, N,N-dipolyoxyethylene tallow alkyl amine, N,N'-dimethylpiperazine, N-methyl-N'-(2-dimethylamino)-ethylpiperazine, N-methylmorpholine, N-ethylmorpholine, N—(N',N'-dimethylaminoethyl)-morpholine, 1,2-dimethylimidazole, dimethylaminoethanol, dimethylaminoethoxyethanol, N,N,N'-trimethylaminoethylethanolamine, N-methyl-N'-(2-hydroxyethyl)-piperazine, N-(2-hydroxyethyl)-morpholine, bis-(2-dimethylaminoethyl)ether, ethyleneglycol bis-(3-dimethyl)-aminopropylether and the like. The amine-based catalyst may be used singly or in combination of two or more types thereof.

The content of the amine-based catalyst contained in the above foam raw material is preferably in the range from 0.03 to 0.20 part by weight, more preferably from 0.05 to 0.16 part by weight, and further preferably from 0.06 to 0.12 part by weight based on 100 parts by weight of the polyol. When the content of the amine-based catalyst is within the above range, a polyurethane foam having excellent elasticity and air permeability (water permeability) can be obtained. The content of the amine-based catalyst is usually selected as appropriate according to adjustment of reaction speeds of foaming and resinification or the like. When a foam raw material containing a urea compound is used, the mixed amount of the amine-based catalyst can be reduced by approximately 20% to 80% by weight, as compared with the conventional technique.

In the case where the polyol is consisting of a polyether polyol and a polymer polyol, the content of the amine-based catalyst in the foam raw material can be further reduced without lowering performances of the polyurethane foam for flame lamination to be obtained, as mentioned above. That is, the polyol leads to the content of the amine-based catalyst of preferably in the range from 0.04 to 0.10 part by weight, more preferably from 0.05 to 0.09 part by weight, and further preferably from 0.06 to 0.09 part by weight based on 100 parts by weight of the polyol consisting of the polyether polyol and polymer polyol.

The foam raw material according to the present invention may further contain an organic metal compound catalyst (hereinafter referred to as "metal catalyst") of at least one type selected from an organic tin compound, organic bismuth compound, organic lead compound, organic zinc compound and the like in addition to the amine-based catalyst.

Examples of the organic tin compound include tin octylate, dibutyltin diacetate, dibutyltin dilaurate, dibutyltin mercaptide, dibutyltin thiocarboxylate, dibutyltin dimaleate, dioctyltin dilaurate, dioctyltin mercaptide, dioctyltin thiocarboxylate and the like.

Examples of the organic bismuth compound include bismuth acetate, naphthenic bismuth, dibutyl bismuth diacetate, dibutyl bismuth dilaurate, dioctyl bismuth dilaurate and the like.

Examples of the organic lead compound include lead acetate, lead octenoate, lead naphthenate, dibutyl lead diacetate, dibutyl lead dilaurate, dioctyl lead dilaurate and the like.

Examples of the organic zinc compound include zinc naphthenate, zinc decanoate, 4-cyclohexylbutyric zinc, zinc neodecanoate, isobutyric zinc, zinc benzoate, zinc p-toluene sulfonate, zinc(II) bis-2,2,6,6-tetramethyl-3,5-heptanedionate and the like.

Each of the above-mentioned compounds may be used singly or in combination of two or more types thereof.

In the case where the metal catalyst is used, the content of the metal catalyst in the foam raw material is preferably in the range from 0.005 to 0.5 part by weight, and more preferably from 0.05 to 0.2 part by weight based on 100 parts by weight of the polyol. When the metal catalyst is used in the above ranged amount, a polyurethane foam having excellent elasticity, air permeability (water permeability) and compression residual strain can be obtained.

The urea compound contained in the foam raw material is preferably a compound having >N—CO—N< or >N—CS—N< and is particularly a compound having >N—CO—N< or >N—CS—N< in which an active hydrogen atom is bound to at least one nitrogen atom in this structure. When such urea compound is used, it can be made to react with a polyisocyanate together with a polyol contained in the foam raw material to form a polyurethane foam with high concentration of a polar group such as urethane bond and urea bond. With this polyurethane foam, a melting temperature during flame lamination can be lowered, and adhesiveness is also improved.

Examples of the urea compound include urea, methylurea, ethylurea, phenylurea, benzylic urea, tolyl urea, biuret, triuret, biurea, thiourea, azodicarbonamide, hydrazodicarbonamide, 4,4'-oxybisbenzenesulfonylhydrazide, 2-dimethylaminoethylurea, N,N-bis(2-dimethylaminoethyl)urea, 3-dimethylaminopropylurea, N,N-bis(3-dimethylaminopropyl)urea and the like. The urea compound may be used singly or in combination of two or more types thereof. Among these compounds, urea, azodicarbonamide and 3-dimethylaminopropylurea are preferable. Particularly preferred is urea and azodicarbonamide.

In the case where the urea compound is consisting of urea and azodicarbonamide, the amounts to be used are respectively, preferably 10% to 90% by weight and 10% to 90% by weight, and more preferably 40% to 60% by weight and 40% to 60% by weight, based on 100% by weight of the total of the both.

The content of the urea compound in the foam raw material is as follows. The lower limit is preferably 0.05 part by weight, more preferably 0.5 part by weight, further preferably 0.8 part by weight, and particularly 1.0 part by weight based on 100 parts by weight of the polyol. On the other hand, the upper limit is preferably 7.0 parts by weight, more preferably 6.0 parts by weight, further preferably 5.5 parts by weight, and particularly 5.2 parts by weight. When the content of the urea compound is within the above range, a polyurethane foam having excellent elasticity, air permeability (water permeability) and compression residual strain can be obtained, and adhesiveness between the obtained polyurethane foam and a fabric, leather and the like is excellent.

In the case where the urea compound is urea, the content of the urea compound (urea) in the foam raw material is preferably in the range from 0.05 to 5.5 parts by weight, more preferably from 0.5 to 5.2 parts by weight, further preferably from 0.7 to 4.5 parts by weight, furthermore preferably from 0.8 to 4.0 parts by weight, more preferably from 0.9 to 3.5 parts by weight, and particularly from 1.0 to 2.6 parts by weight based on 100 parts by weight of the polyol. When the content of the urea compound (urea) is within the above range, a polyurethane foam having excellent elasticity, air permeability (water permeability) and compression residual strain can be obtained, and adhesiveness between the obtained polyurethane foam and a fabric, leather or the like is excellent.

In the case where the urea compound is urea and the polyol is consisting of a polyether polyol, the content of the urea compound (urea) in the foam raw material is preferably in the range from 1.0 to 4.3 parts by weight, more preferably from 1.2 to 4.0 parts by weight, and further preferably from 2.2 to 3.5 parts by weight based on the 100 parts by weight of the polyol and the content of the amine-based catalyst is preferably in the range from 0.05 to 0.16 part by weight, and more preferably from 0.06 to 0.12 part by weight based on 100 parts by weight of the polyol. When the foam raw material having such composition is used, an excellent balance between adhesiveness of a resulting polyurethane foam and a fabric made of synthetic fibers or natural fibers, a leather or the like and residual compression strain is obtained, an excellent wet-heat resistance is also obtained, and VOC total value can be reduced. Even if the polyol is consisting of a polyether polyol and a polymer polyol, the similar effect can be obtained.

Additionally, in the case where the urea compound is azodicarbonamide, the content of the urea compound (azodicarbonamide) in the foam raw material is preferably in the range from 0.05 to 7.0 parts by weight, and more preferably from 0.5 to 6.8 parts by weight based on 100 parts by weight of the polyol. When the content of this urea compound (azodicarbonamide) is within the above range, handling of the foam raw material is easy, a polyurethane foam having excellent elasticity, air permeability (water permeability) and compression residual strain can be obtained, and adhesiveness between the obtained polyurethane foam and a fabric, leather or the like is excellent.

Further, in the case where the urea compound is consisting of urea and azodicarbonamide, the content of the urea compound (total of urea and azodicarbonamide) in the foam raw material is preferably in the range from 1.2 to 4.0 parts by weight, more preferably 1.4 to 3.2 parts by weight, and further preferably 1.6 to 2.5 parts by weight based on 100 parts by weight of the polyol. When the content of this urea compound is within the above range, handling of the foam raw material is easy, a polyurethane foam having excellent elasticity, air permeability (water permeability) and compression residual strain can be obtained, adhesiveness between the obtained polyurethane foam and a fabric, leather or the like is excellent, and VOC total value can be reduced.

The foam raw material may further contain an adhesion improving agent, a crosslinking agent, a chain extender, a foam breaker, an antifoaming agent, a plasticizer, an ultraviolet absorber, an antiaging agent, a flame retardant, a stabilizer, a coloring agent and the like as long as the effect by the present invention is not lost.

Examples of the adhesion improving agent include a polyester polyol having a molecular weight of less than 1,500, a low molecular weight polyol having a molecular weight of 100 to 700, an organic phosphate ester, an amine-based crosslinking agent, and the like. In the case where the adhesion improving agente is used, the content of the adhesion improving agent in the foam raw material is preferably in the range from 0.1 to 5 parts by weight, and more preferably 0.5 to 3 parts by weight based on 100 parts by weight of the polyol. When the adhesion improving agent is contained in an amount of the above ratio, adhesiveness between the obtained polyurethane foam and a fabric, leather or the like might be further improved.

A polyurethane foam for flame lamination can be produced using the foam raw material. That is, when a polyol and a polyisocyanate react in the presence of a foaming agent, a foam control agent (foam stabilizer, surfactant), an amine-based catalyst and a urea, compound, a polyurethane foam for flame lamination can be produced. The foam raw material can have a period of time from start of mixing and stirring of the foam raw material to start of foaming, that is, a cream time of preferably 10 to 30 seconds, and more preferably 12 to 25 seconds. Thereby the polyurethane foam can be obtained without defect such as a crack. In the production of the polyurethane foam, a known apparatus can be used, and make possible by large-scale production stably.

When the polyurethane foam for flame lamination is produced, either of a one-shot method and a prepolymer method may be employed. The one-shot method is a method in which a polyol and a polyisocyanate are subjected to a reaction directly. The prepolymer method is a method in which a polyol and a polyisocyanate are subjected to a reaction in advance to form a prepolymer having an isocyanate group at the terminal, and a polyol is subjected to a reaction with the pre-polymer. To produce the polyurethane foam, a slab method is used. For example, a lengthy body obtained by thinning work of lengthy polyurethane foam obtained by the slab method to a predetermined thickness is generally bonded to a fabric, leather or the like in general.

The polyurethane foam for flame lamination of the present invention is preferably a soft body having elasticity. This soft body has a density in compliance with JIS K 7222 of preferably 15 to 60 kg/m$^3$, and more preferably 20 to 40 kg/m$^3$ The 25%-hardness according to JIS K 6400-2 is preferably in the range from 50 to 300 N, and more preferably from 80 to 200 N and the compression residual strain according to JIS K 6400-4 is preferably 12% or less, more preferably 10% or less, and further preferably in the range from 0.5% to 8%. These are characteristics suitable as component members including a seat portion and a seat back portion in a seat of a vehicle (seat), a child seat and the like; a cushion material for a bed, a mattress and the like for furniture and a seat portion and a seat back portion in a seat of a chair, sofa and the like, a pad and the like.

In addition, the VOC total value can be reduced to preferably less than 1,000 ppm by weight, and more preferable is in the range from 400 to 800 ppm by weight. When a laminated body obtained using the polyurethane foam for flame lamination of the present invention or the like is used as an interior material for vehicle, furniture, living goods and the like, a problem can be suppressed in which the VOC attaches to a glass surface of an automobile or housing and a worry about an influence on a human body like formaldehyde causing a sick house syndrome can be reduced.

Since the polyurethane foam for flame lamination is produced using the above-mentioned foam raw material, it is excellent in thermal adhesiveness.

In the polyurethane foam for flame lamination of the present invention, a difference Δt (=t2−t1) between a melting start temperature (t1) and a decomposition peak temperature (t2) measured under conditions shown in Example below with a thermogravimetric analyzer is preferably 200° C. or higher, and more preferably 205° C. to 235° C., which is excellent in melting performance.

When a surface of the polyurethane foam for flame lamination of the present invention is molten by heat and brought a fabric comprising a synthetic fiber of a polyamide resin or a polyester resin or the like, a natural fiber of cotton or wooden material; a leather and the like into contact with the molten portion, they can be integrated (flame lamination method). The contact article may be pressed from one side or from the both sides. As a result, a laminated body provided with a foamed material layer consisting of the polyurethane foam for flame lamination of the present invention and a skin material layer consisting of a fabric, leather or the like can be produced efficiently.

As mentioned above, the laminated body of the present invention comprises a foamed material layer consisting of the polyurethane foam for flame lamination of the present invention and a skin material layer at least partially bonded to a surface of the foamed material layer. The skin material layer may be disposed only on one side of the foamed material layer or may be disposed on the both sides. When the skin material layer is disposed on the both sides, the skin material layer on the one side and the skin material layer on the other side may be made of the same material or from different materials.

Thicknesses of the foamed material layer and the skin material layer may be appropriately selected according to the purpose, application and the like. The thicknesses of the foamed material layer and the skin material layer are generally 2.0 to 20.0 mm and 0.1 to 4.0 mm, respectively.

In the laminated body of the present invention, adhesiveness between the foamed material layer and the skin material layer is excellent regardless of the types of the fabric, leather and the like. When the skin material layer is a nonwoven fabric made of polyamide resin, for example, the peel strength measured according to JIS L 1066 after being left in the atmosphere at room temperature for 2 minutes for the produced laminated body having a length of 200 mm, width of 50 mm and thickness of 10 mm can be preferably 3.5 N or higher, more preferably 4.0 N or higher, and further preferably 5.0 N or higher. Additionally, the peel strength measured after being left in the atmosphere at room temperature for 24 hours for the produced laminated body having a length of 200 mm, width of 25 mm and thickness of 10 mm can be preferably 3.0 N or higher, and more preferably 4.2 N or higher. In this case, when the foamed material layer consisting of the polyurethane foam and the skin material layer are peeled from each other, the peeling is preferably caused by material destruction not at interface. Moreover, the peel strength measured after being left in the atmosphere at a temperature of 120° C. and a relative humidity of 95% for 24 hours for the produced laminated body having a length of 200 mm, width of 25 mm and thickness of 10 mm can be preferably 3 N or higher, and more preferably 4 N or higher. Particularly, in the case where the use environment of the product provided with the laminated body of the present invention is changed according to a season or the like, when a laminated body provided with a polyurethane foam for flame lamination which is obtained using the foam raw material containing a polyether polyol as a polyol and in which hydrolysis is suppressed and shape stability is excellent is used, excellent durability can be obtained.

As mentioned above, the laminated body of the present invention is useful for an interior material for vehicle including a seat portion and a seat back portion in a seat of a vehicle (seat), a child seat and the like; furniture; living goods such as cloth and general merchandise; sanitary products; medical products; nursing products and the like. Particularly, the laminated body is suitable for the interior material for vehicle.

When the laminated body of the present invention is applied to the above applications, a peripheral edge portion or the like is sewn together as necessary.

In the case where the polyurethane foam for flame lamination of the present invention is a constituent material of an interior material for vehicle, when a foam raw material in which the contents of the amine-based catalyst and the urea compound are respectively preferably 0.03 to 0.20 part by weight and 0.05 to 7.0 parts by weight, more preferably 0.05 to 0.16 part by weight and 0.5 to 5.2 parts by weight, and further preferably 0.06 to 0.12 part by weight and 0.9 to 3.5 parts by weight, based on 100 parts by weight of the polyol in the foam raw material containing the polyol, polyisocyanate, foaming agent, foam control agent (foam stabilizer, surfactant), amine-based catalyst and urea compound, excellent performances can be obtained. In these cases, the isocyanate index is preferably in the range from 70 to 130, and more preferably from 105 to 120. When such foam raw material is used, the compression residual strain can be preferably reduced to preferably 8% or less and more preferably 7.5% or less, and the peel strength can be preferably 6.5 N or more at a time when a nonwoven fabric made of polyamide resin is used as the skin material layer to form a laminated body.

Addition, when a polyurethane foam for flame lamination obtained using urea as the urea compound in the case where the polyol is consisting of a polyether polyol or of a polyether polyol and a polymer polyol, is used to form a composite product such as a laminated body, the product is excellent in wet-heat resistance and durability without being affected by a change in the environment (temperature, humidity and the like) in a vehicle or the like.

EXAMPLES

Hereinafter, the present invention is specifically described using Examples, however, the present invention is in no way limited to the embodiments by Examples without departing from the scope of the invention.
1. Material Components
Materials used in Examples and Comparative Examples are as follows.
1-1. Polyol
(1) Polyol (A1)
Polyoxyethylene/oxypropylene ether polyol (EO/PO adduct, trade name "GP-3050" manufactured by Sanyo Chemical Industries, Ltd.) was used. The number of functional group is 3, hydroxyl group value is 56.1 mg KOH/g, and weight-average molecular weight is 3,000.
(2) Polyol (A2)
A polymer polyol obtained by polymerizing a monomer consisting of 20% by weight of acrylonitrile and 80% by weight of styrene in the presence of a polyol equivalent to the polyol (A1) was used. A weight ratio of polymerized parts of acrylonitrile and styrene is 40% by weight based on the entire polymer polyol. The number of functional group is 3, hydroxyl group value is 32 mg KOH/g, and weight-average molecular weight is 5,300.
(3) Polyol (A3)
Polyoxyalkylene ether/polyester block copolymer polyol (trade name "L-50" manufactured by Mitsui Takeda Chemicals Inc.) was used. Hydroxyl group value is 56.1 mg KOH/g, and weight-average molecular weight is 3,000.
1-2. Polyisocyanate
(1) Polyisocyanate (B1)
Tolylene diisocyanate containing 2,4-TDI and 2,6-TDI with a ratio of 80:20 (trade name "Coronate T-80" manufactured by Nippon Polyurethane Industry Co., Ltd.) was used.
(2) Polyisocyanate (B2)
Polymeric 4,4'-diphenylmethane diisocyanate (trade name "M-20S" manufactured by BASF INOAC Polyurethanes Ltd.) was used.
1-3. Foaming Agent
(1) Foaming Agent (C1)
Water was used.
(2) Foaming Agent (C2)
Methylene chloride was used.
1-4. Foam Control Agent
(1) Foam Control Agent (D1)
A silicone foam control agent (trade name "SZ-1136" manufactured by Dow Corning Toray Co., Ltd.) was used.
(2) Foam Control Agent (D2)
A silicone foam control agent (trade name "SZ-1346E" manufactured by Dow Corning Toray Co., Ltd.) was used.
1-5. Catalyst
(1) Amine-Based Catalyst (E1)
Triethylenediamine (trade name "Dabco" manufactured by Air Products Japan Inc.) was used.

(2) Metal Catalyst (E2)
Stannous octoate (trade name "MRH-110" manufactured by Johoku Chemical Co., Ltd.) was used.
1-6. Urea Compound
Urea, azodicarbonamide and 3-dimethylaminopropylurea were used.
1-7. Additives
In order to improve adhesiveness between a polyurethane foam and a fabric (nonwoven fabric made of nylon) for the evaluation of adhesiveness, the following components were used.
(1) Additive (F1)
Polyoxyethylene ether polyol (EO adduct, trade name "PEG-200" manufactured by Sanyo Chemical Industries, Ltd.) was used. The number of functional group is 2, hydroxyl group value is 561 mg KOH/g, and weight-average molecular weight is 200.
(2) Additive (F2)
Tris(dipropylene glycol) phosphite (trade name "CS-22" manufactured by Momentive Performance Materials Inc.) was used. The number of functional group is 3, and hydroxyl group value is 395 mg KOH/g.
2. Production and Evaluation of Polyurethane Foam for Flame Lamination

Comparative Example 1

Raw material components other than polyisocyanate were mixed according to the ratio shown in Table 1, and then polyisocyanate was formulated to further mix. Subsequently, the obtained mixture was charged into a foaming box to foam and harden. The resultant polyurethane foam was left at a room temperature for 24 hours so as to obtain polyurethane foam for flame lamination.

The obtained polyurethane foam for flame lamination was evaluated for the following items. The results are shown in Table 1.
(1) Foaming Stability
Polyurethane foam was formed using a molding die having a size of 300 mm×300 mm, and then cream time, rise time, response and foam state were observed and determined according to the following criteria.
Good: The cream time was in the range from 12 to 25 seconds, open-cell was formed, drawdown and contraction were not found, and favorable polyurethane foam was obtained.
Fair: Polyurethane foam was obtained and the cream time was in the range from 7 to 12 seconds or from 25 to 30 seconds, or polyurethane foam was obtained and cell tended to be independent.
Poor: The cream time was less than 7 seconds or longer than 30 seconds, or evaluable polyurethane foam could not be obtained due to contraction and drawdown.
(2) Cream Time
The time from start of mixing and stirring of the foam raw material to start of foaming was measured. When this time is less than 10 seconds, a defective phenomenon such as a crack might be caused, and productivity of polyurethane foam having excellent performances is lowered.
(3) Density, Hardness and Compression Residual Strain
The density, hardness and compression residual strain of the polyurethane foam were measured in compliance with JIS K 7222, JIS K 6400-2 and JIS K 6400-4, respectively.
(4) VOC Total Value
7 mg of the polyurethane foam was put in a glass tube, set in a thermal desorption apparatus (thermal desorption condition: 90° C.×30 minutes), and a generated gas was analyzed by GC-MS according to VDA 278. Total amount of the detected volatile gas was determined to be VOC total value.

(5) Thermogravimetric Analysis

Using a TG/DTA apparatus manufactured by Seiko Instruments Inc., a melting start temperature and a decomposition peak temperature of the polyurethane foam were measured while increasing temperature from a room temperature to 400° C. at a rate of 10° C. per minute under an air atmosphere of a flow rate of 200 ml per minute.

(6) Adhesiveness

The polyurethane foam was cut to obtain a test piece having a length of 200 mm, a width of 50 mm, and a thickness of 10 mm. After that, the test piece was made to pass over a flame of LP gas adjusted to a width of 100 mm and a height of 70 mm at a rate of 8 meters per minute and to melt the surface. Subsequently, a nonwoven fabric made of nylon having a length of 400 mm, a width of 100 mm, and a thickness of 0.4 mm was overlapped on the molten surface, which was made to pass through rolls to be compression bonded so as to obtain a laminated body.

After the laminated body was formed, it was left in the atmosphere, and peel strength after being left for 2 minutes and for 24 hours was measured according to JIS L 1066. The size of the laminated body offered for the measurement was a width of 50 mm and a length of 200 mm in the case where the peel strength was measured at a time of 2 minutes after the laminated body was produced, and a width of 25 mm and a length of 200 mm in the case where the peeing strength was measured at a time of 24 hours after the laminated body was produced. It is noted that "*" means that peeling was not interface peeling but material destruction in the peeling test, and "-" means that adhesiveness between the polyurethane foam and the nonwoven fabric made of nylon was not possible in Tables 1 to 3.

(7) Wet-Heat Resistance

The laminated body in the above (6) was left for 24 hours (wet-heat test) under the conditions of a temperature of 120° C. and relative humidity of 95% and the peel strength was measured similarly to the above (6).

Comparative Example 2

A polyurethane foam for flame lamination was produced in the same manner as those in Comparative Example 1 except that 2 parts of the additive F1 was formulated into the foam raw material used in Comparative Example 1 and evaluated. The results are shown in Table 1.

As obvious from Table 1, Comparative Example 1 showed that adhesiveness was not sufficient, and the VOC total value was extremely high at 1,284 ppm by weight. Additionally, Comparative Example 2 was an example in which the foam raw material containing the additive F1 was used, and initial peel strength was small at 3.2 N in the evaluation of adhesiveness, which was better than Comparative Example 1 but still not sufficient, and the VOC total value was also extremely high at 1,258 ppm by weight.

Example 1

A polyurethane foam for flame lamination was produced in the same manner as those in Comparative Example 1 except that 0.1 part of urea was formulated into the foam raw material used in Comparative Example 1 and evaluated. The results are shown in Table 1.

Example 2

A polyurethane foam for flame lamination was produced in the same manner as those in Example 1 except that a foam raw material in which 0.11 part of the amine-based catalyst E1 was formulated was used, and evaluated. The results are shown in Table 1.

As obvious from Table 1, according to Example 1, the initial peel strength was improved to 5.0 N in the evaluation of adhesiveness, the VOC total value was reduced by approximately 5% as compared with that in Comparative Example 1. According to Example 2, though the initial peel strength was lowered to 4.0 N as compared with that in Example 1, the final peel strength was 3.6 N, which was more excellent than that in Example 1. In addition, the VOC total value was 701 ppm by weight, which was reduced by approximately 42% as compared with that in Example 1.

Example 3

A polyurethane foam for flame lamination was produced in the same manner as those in Example 2 except that a foam raw material in which 1 part of urea was formulated was used, and evaluated. The results are shown in Table 1.

Example 4

A polyurethane foam for flame lamination was produced in the same manner as those in Example 2 except that a foam raw material in which 1.5 part of urea was formulated was used, and evaluated. The results are shown in Table 1.

Example 5

A polyurethane foam for flame lamination was produced in the same manner as those in Example 1 except that a foam raw material in which 0.088 part of the amine-based catalyst E1 and 2.5 parts of urea were formulated was used, and evaluated. The results are shown in Table 1.

As obvious from Table 1, the initial peel strengths in Examples 3, 4 and 5 were 6.2 N, 6.8 N and 7.2 N, respectively, which were further Improved from Example 2. Additionally, the peel strengths measured after 24 hours were 4.4 N, 4.8 N and 4.9 N, and the peel strengths after the wet-heat test were 4.1 N, 4.7 N and 4.7 N, respectively, which means that the larger the content of urea in the foam raw material was, the more excellent adhesiveness became. Particularly, the peel strengths after the wet-heat test in Examples 4 and 5 were close to the values of the peel strength measured 24 hours after the production, which exceeded 4.5 N, and the compression residual strains were in the range from 6.8% to 7.2%. These results show that a balance in adhesiveness, heat and humidity resistance, and shape retention is excellent.

Examples 6 to 14

Raw material components other than polyisocyanate were mixed according to the ratio shown in Tables 1 and 2, and then polyisocyanate was formulated to further mix. Subsequently, the obtained mixture was charged into a foaming box to foam and harden. The resultant polyurethane foams were left at a room temperature for 24 hours so as to obtain polyurethane foams for flame lamination and evaluate. The results are shown in Tables 1 and 2.

As obvious from Tables 1 and 2, Examples 8 and 9 are examples in which the amount of a foaming agent used was changed so as to give a low density product and a high density product, and favorable physical characteristics were obtained for both. Example 11 is an example in which two kinds of polyol was used and the amount of the amine-based catalyst E1 used was 0.07 part, and performances more excellent in peel strength, compression residual strain and VOC total value were obtained than Example 4.

TABLE 1

|  |  |  | Example | | | | | | | | Comparative Example | |
|---|---|---|---|---|---|---|---|---|---|---|---|---|
|  |  |  | 1 | 2 | 3 | 4 | 5 | 6 | 7 | 8 | 1 | 2 |
| Foam raw material (parts by weight) | Polyol A1 |  | 100 | 100 | 100 | 100 | 100 | 100 | 100 | 100 | 100 | 100 |
|  | Polyisocyanate B1 |  | 55.7 | 55.3 | 58.3 | 60 | 63.2 | 71.5 | 74.6 | 64.4 | 55.3 | 57.3 |
|  | Isocyanate Index |  | 115 | 115 | 115 | 115 | 115 | 115 | 115 | 115 | 115 | 115 |
|  | Foaming agent C1 |  | 4 | 4 | 4 | 4 | 4 | 4 | 4 | 4.4 | 4 | 4 |
|  | Foaming agent C2 |  |  |  |  |  |  |  |  | 6 |  |  |
|  | Foam control agent D1 |  | 1 | 1 | 1 | 1 | 1 | 1 | 1 | 1 | 1 | 1 |
|  | Amine-based catalyst E1 |  | 0.18 | 0.11 | 0.11 | 0.11 | 0.088 | 0.07 | 0.02 | 0.11 | 0.18 | 0.18 |
|  | Metal catalyst E2 |  | 0.1 | 0.1 | 0.1 | 0.1 | 0.1 | 0.1 | 0.1 | 0.1 | 0.1 | 0.1 |
|  | Urea |  | 0.1 | 0.1 | 1 | 1.5 | 2.5 | 5 | 6.5 | 1.5 |  |  |
|  | Additive F1 |  |  |  |  |  |  |  |  |  |  | 2 |
| Evaluation | Foaming stability |  | Good | Good | Good | Good | Good | Fair | Fair | Good | Good | Good |
|  | Cream time | sec. | 12-17 | 17-22 | 15-20 | 15-20 | 12-17 | 8-12 | 8-12 | 15-20 | 15-20 | 15-20 |
|  | Density | kg/m³ | 26.2 | 26.1 | 25.2 | 25.8 | 25.2 | 24.1 | 24.1 | 20.3 | 26.5 | 24.5 |
|  | Hardness | N | 105 | 103 | 100 | 102 | 98 | 95 | 95 | 85 | 103 | 102 |
|  | Compression residual strain | % | 5.6 | 5.1 | 6.3 | 6.8 | 7.2 | 9.2 | 11.6 | 7.1 | 8.3 | 14.6 |
|  | VOC total value | ppm by weight | 1213 | 701 | 722 | 731 | 655 | 617 | 436 | 682 | 1284 | 1258 |
|  | Melting start temperature (t1) | ° C. | 118 | 116 | 110 | 105 | 100 | 93 | 89 | 107 | 168 | 115 |
|  | Decomposition temperature (t2) | ° C. | 326 | 325 | 321 | 319 | 317 | 315 | 301 | 320 | 343 | 329 |
|  | Δt (= t2 − t1) | ° C. | 208 | 209 | 211 | 214 | 217 | 222 | 212 | 213 | 175 | 214 |
|  | Peel strength (before test) | N | 5.0 | 4.0 | 6.2 | 6.8 | 7.2 | 7.9 | 8.3 | 6.5 | 0.1 | 3.2 |
|  | Peel strength (after 24 h) | N | 3.2* | 3.6* | 4.4* | 4.8* | 4.9* | 4.2* | 5.0* | 4.3* | — | 2.1* |
|  | Peel strength (after wet-heat test) | N | 3.0* | 3.4* | 4.1* | 4.7* | 4.7* | 4.1* | 4.8* | 4.2* | — | 2.0* |

TABLE 2

|  |  |  | Example | | | | | |
|---|---|---|---|---|---|---|---|---|
|  |  |  | 9 | 10 | 11 | 12 | 13 | 14 |
| Foam raw material (parts by weight) | Polyol A1 |  | 100 | 100 | 50 | 100 | 100 | 100 |
|  | Polyol A2 |  |  |  | 50 |  |  |  |
|  | Polyisocyanate B1 |  | 34.3 |  | 57.7 | 54.8 | 57.4 | 62.6 |
|  | Polyisocyanate B2 |  |  | 93.5 |  |  |  |  |
|  | Isocyanate Index |  | 115 | 115 | 115 | 105 | 110 | 120 |
|  | Foaming agent C1 |  | 1.7 | 4 | 4 | 4 | 4 | 4 |
|  | Foam control agent D1 |  | 1 |  | 1 | 1 | 1 | 1 |
|  | Foam control agent D2 |  |  | 1 |  |  |  |  |
|  | Amine-based catalyst E1 |  | 0.07 | 0.035 | 0.07 | 0.11 | 0.11 | 0.11 |
|  | Metal catalyst E2 |  | 0.07 |  | 0.1 | 0.15 | 0.12 | 0.1 |
|  | Urea |  | 1.5 | 1.5 | 1.5 | 1.5 | 1.5 | 1.5 |
| Evaluation | Foaming stability |  | Good | Fair | Good | Good | Good | Good |
|  | Cream time | sec. | 15-20 | 15-20 | 15-20 | 15-20 | 15-20 | 15-20 |
|  | Density | kg/m³ | 48.3 | 25.3 | 25.3 | 26.2 | 26 | 25.3 |
|  | Hardness | N | 123 | 120 | 141 | 85 | 91 | 110 |
|  | Compression residual strain | % | 4.2 | 11.5 | 6.9 | 6.4 | 6.5 | 7.8 |
|  | VOC total value | ppm by weight | 582 | 428 | 712 | 756 | 744 | 731 |
|  | Melting start temperature (t1) | ° C. | 110 | 110 | 109 | 108 | 108 | 103 |
|  | Decomposition temperature (t2) | ° C. | 331 | 342 | 321 | 320 | 319 | 319 |
|  | Δt (= t2 − t1) | ° C. | 221 | 235 | 212 | 212 | 211 | 216 |
|  | Peel strength (before test) | N | 6.5 | 6.5 | 7.0 | 4.8 | 6.5 | 6.8 |
|  | Peel strength (after 24 h) | N | 4.5* | 3.6* | 4.8* | 4.5* | 4.9* | 4.2* |
|  | Peel strength (after wet-heat test) | N | 4.5* | 3.5* | 4.8* | 4.2* | 4.6* | 4.0* |

Example 15 and Comparative Examples 3 to 5

Raw material components other than polyisocyanate were mixed according to the ratio shown in Table 3, and then polyisocyanate was formulated to further mix. Subsequently, the obtained mixture was charged into a foaming box to foam and harden. The resultant polyurethane foams were left at a room temperature for 24 hours so as to obtain polyurethane foams for flame lamination and evaluate. The results are shown in Table 3.

TABLE 3

|  |  | Example | Comparative Example | | |
|---|---|---|---|---|---|
|  |  | 15 | 3 | 4 | 5 |
| Foam raw material (parts by weight) | Polyol A1 | 50 | 50 | 50 | |
|  | Polyol A3 | 50 | 50 | 50 | 100 |
|  | Polyisocyanate B1 | 60 | 55.3 | 56.7 | 55.5 |
|  | Isocyanate Index | 115 | 115 | 115 | 115 |
|  | Foaming agent C1 | 4 | 4 | 4 | 4 |
|  | Foam control agent D1 | 1 | 1 | 1 | 1 |
|  | Amine-based catalyst E1 | 0.07 | 0.14 | 0.14 | 0.14 |
|  | Metal catalyst E2 | 0.1 | 0.1 | 0.1 | 0.1 |
|  | Urea | 1.5 | | | |
|  | Additive F2 | | | 2 | |
| Evaluation | Foaming stability | Good | Good | Good | Good |
|  | Cream time sec. | 15-20 | 15-20 | 15-20 | 15-20 |
|  | Density kg/m³ | 26.3 | 24.1 | 25.1 | 26.7 |
|  | Hardness N | 105 | 102 | 108 | 105 |
|  | Compression residual strain % | 7.0 | 7.1 | 15.3 | 5.1 |
|  | VOC total value ppm by weight | 534 | 1022 | 1138 | 1011 |
|  | Melting start temperature (t1) °C. | 91 | 111 | 121 | 110 |
|  | Decomposition temperature (t2) °C. | 312 | 320 | 335 | 328 |
|  | Δt (= t2 − t1) °C. | 221 | 209 | 214 | 218 |
|  | Peel strength (before test) N | 8.5 | 3.2 | 6.2 | 6.5 |
|  | Peel strength (after 24 h) N | 4.9* | 2.4* | 4.2* | 4.5* |
|  | Peel strength N (after wet-heat test) | 3.1* | 1.0* | 2.1* | 1.4* |

As obvious from Table 3, Comparative Example 4 is an example in which the additive F2 was incorporated into the foam raw material of Comparative Example 3, and improvement was found in the peel strength over Comparative Example 3, and the compression residual strain and VOC total value of Comparative Example 4 were both deteriorated. On the other hand, Example 15 is an example in which the amount of the amine-based catalyst E1 used to the foam raw material in Comparative Example 3 was reduced to 0.07 part and urea was formulated, and the peel strength, compression residual strain, and VOC total value measured after the production were more excellent than Comparative Examples 3 and 4.

Additionally, Comparative Example 5 is an example in which a foam raw material contains the polyol A3 and no urea, and wet-heat resistance was not sufficient, and the VOC total value was as high as 1,011 ppm by weight.

Examples 16 to 22

Raw material components other than polyisocyanate were mixed according to the ratio shown in Table 4, and then polyisocyanate was formulated to further mix. Subsequently, the obtained mixture was charged into a foaming box to foam and harden. The resultant polyurethane foams were left at a room temperature for 24 hours so as to obtain polyurethane foams for flame lamination and evaluate. The results are shown in Table 4.

TABLE 4

|  |  |  | Example | | | | | | |
|---|---|---|---|---|---|---|---|---|---|
|  |  |  | 16 | 17 | 18 | 19 | 20 | 21 | 22 |
| Foam raw material (parts by weight) | Polyol A1 | | 100 | 100 | 100 | 100 | 50 | | 100 |
|  | Polyol A2 | | | | | | | 100 | |
|  | Polyol A3 | | | | | | 50 | | |
|  | Polyisocyanate B1 | | 59.9 | 56.8 | 67.3 | 70.2 | 56.8 | 56.8 | 56.1 |
|  | Isocyanate Index | | 115 | 115 | 115 | 115 | 115 | 115 | 115 |
|  | Foaming agent C1 | | 4 | 4 | 4 | 4 | 4 | 4 | 4 |
|  | Foam control agent D1 | | 1 | 1 | 1 | 1 | 1 | 1 | 1 |
|  | Amine-based catalyst E1 | | 0.07 | 0.15 | 0.15 | 0.15 | 0.15 | 0.15 | 0.07 |
|  | Metal catalyst E2 | | 0.1 | 0.1 | 0.1 | 0.1 | 0.1 | 0.07 | 0.1 |
|  | Urea | | 1 | | | | | | |
|  | Azodicarbonamide | | 1 | 1.5 | 6.5 | 8 | 1.5 | 1.5 | |
|  | Dimethylaminopropylurea | | | | | | | | 1.5 |
| Evaluation | Foaming stability | | Good | Good | Good | Good | Good | Good | Good |
|  | Cream time | sec. | 15-20 | 15-20 | 15-20 | 15-20 | 15-20 | 15-20 | 15-20 |
|  | Density | kg/m³ | 25.3 | 25.2 | 25.1 | 24.0 | 25.6 | 25.5 | 25.4 |
|  | Hardness | N | 102 | 100 | 103 | 105 | 121 | 102 | 105 |
|  | Compression residual strain | % | 6.8 | 6.0 | 6.9 | 15.9 | 7.5 | 8.5 | 7.0 |
|  | VOC total value | ppm by weight | 723 | 980 | 983 | 991 | 942 | 933 | 728 |
|  | Melting start temperature (t1) | °C. | 106 | 105 | 101 | 102 | 108 | 80 | 105 |
|  | Decomposition temperature (t2) | °C. | 315 | 317 | 315 | 312 | 315 | 309 | 314 |
|  | Δt (=t2 − t1) | °C. | 209 | 212 | 214 | 210 | 207 | 229 | 209 |
|  | Peel strength (before test) | N | 7.0 | 6.7 | 8.0 | 8.2 | 6.9 | 7.0 | 6.7 |
|  | Peel strength (after 24 h) | N | 4.9* | 4.9* | 5.6* | 6.0* | 4.9* | 5.0* | 4.8* |

TABLE 4-continued

|  |  | Example | | | | | | |
|---|---|---|---|---|---|---|---|---|
|  |  | 16 | 17 | 18 | 19 | 20 | 21 | 22 |
| Peel strength (after wet-heat test) | N | 4.8* | 4.6* | 5.4* | 5.8* | 4.8* | 2.0* | 4.7* |

INDUSTRIAL APPLICABILITY

According to the polyurethane foam of the present invention for flame lamination, when a laminated body excellent in adhesiveness between a foamed material layer consisting of the polyurethane foam and a skin material layer is produced by forming the skin material layer consisting of a fabric or the like on at least one surface, the laminated body is suitably used for an interior material for vehicle; furniture; living goods such as cloth and general merchandise; sanitary products; medical products; nursing products and the like. The polyurethane foam of the present invention for flame lamination is particularly suitable as component members including a seat portion and a seat back portion in a seat of a vehicle (seat), a child seat and the like; a cushion material for a bed, a mattress and the like for furniture and a seat portion and a seat back portion in a seat of a chair, sofa and the like, a pad and the like.

The invention claimed is:

1. A polyurethane foam for flame lamination which is produced by a process comprising:
    providing a foam raw material comprising a polyol, a polyisocyanate, a foaming agent, a foam control agent, an amine-based catalyst and a urea compound; and
    applying a slab method to the foam raw material to provide the polyurethane foam for flame lamination,
    wherein an average hydroxyl value of the polyol is in a range from 30 to 80 mg KOH/g, and
    wherein said urea compound is at least one compound selected from the group consisting of urea, methylurea, ethylurea, phenylurea, benzylic urea, tolyl urea, biuret, triuret, biurea, thiourea, 2-dimethylaminoethylurea, and N,N-bis(2-dimethyl-aminoethyl)urea.

2. The polyurethane foam for flame lamination according to claim 1, wherein said polyol consists of a polyether polyol.

3. The polyurethane foam for flame lamination according to claim 1, wherein said polyol consists of a polyether polyol and a polymer polyol.

4. The polyurethane foam for flame lamination according to claim 1, wherein the content of said amine-based catalyst is in the range from 0.03 to 0.20 part by weight based on 100 parts by weight of said polyol.

5. The polyurethane foam for flame lamination according to claim 1, wherein the content of said urea compound is in the range from 0.05 to 7.0 parts by weight based on 100 parts by weight of said polyol.

6. The polyurethane foam for flame lamination according to claim 2, wherein the content of said amine-based catalyst is in the range from 0.03 to 0.20 part by weight based on 100 parts by weight of said polyol, wherein said urea compound is urea, and wherein the content of said urea is in the range from 0.05 to 5.5 parts by weight based on 100 parts by weight of said polyol.

7. The polyurethane foam for flame lamination according to claim 3, wherein the content of said amine-based catalyst is in the range from 0.03 to 0.20 part by weight based on 100 parts by weight of said polyol, wherein said urea compound is urea, and wherein the content of said urea is in the range from 0.05 to 5.5 parts by weight based on 100 parts by weight of said polyol.

8. The polyurethane foam for flame lamination according to claim 1, wherein said urea compound is urea, and wherein the content of said urea is in the range from 0.05 to 5.5 parts by weight based on 100 parts by weight of said polyol.

9. The polyurethane foam for flame lamination according to claim 8, wherein said urea compound is urea, wherein the content of said urea is in the range from 0.8 to 3.5 parts by weight based on 100 parts by weight of said polyol, and wherein the content of said amine-based catalyst is in the range from 0.05 to 0.16 part by weight based on 100 parts by weight of said polyol.

10. A laminated body comprising a foamed material layer consisting of said polyurethane foam for flame lamination according to claim 1 and a skin material layer at least partially bonded to a surface of said foamed material layer.

11. An interior material for vehicle comprising said laminated body according to claim 10.

* * * * *